United States Patent [19]

Stephens

[11] Patent Number: 4,803,698
[45] Date of Patent: Feb. 7, 1989

[54] ELECTRICALLY HEATED FOREHEARTH

[75] Inventor: Alan Stephens, South Ruislip, Great Britain

[73] Assignee: B.H.F. (Engineering) Limited, Middlesex, England

[21] Appl. No.: 776,906

[22] Filed: Sep. 17, 1985

[30] Foreign Application Priority Data

Sep. 20, 1984 [GB] United Kingdom ............... 8423801

[51] Int. Cl.⁴ ............................................. C03B 18/18
[52] U.S. Cl. ...................................... 373/27; 373/134; 65/356; 65/347
[58] Field of Search ................. 373/27, 109, 117, 128, 373/134, 133, 132; 219/553; 338/217, 218; 65/326, 346, 347, 350, 355, 356

[56] References Cited

U.S. PATENT DOCUMENTS

| | | | |
|---|---|---|---|
| 3,133,803 | 5/1964 | Denman | 65/347 |
| 3,289,139 | 11/1966 | Hyde | 338/218 |
| 4,494,974 | 1/1985 | Vilk et al. | 65/347 X |
| 4,622,678 | 11/1986 | Scarfe | 373/134 |

Primary Examiner—Roy N. Envall, Jr.
Attorney, Agent, or Firm—Cushman, Darby & Cushman

[57] ABSTRACT

An electrically heated forehearth for use in glass production is heated by means of a plurality of radiant heating elements, each element traversing the forehearth substantially at right angles to the direction of glass flow and each element comprising heating zones at each edge portion and a central, non-heating zone. With the forehearth according to the present invention the molten glass is heated electrically at its edge, cooler, portions only. The central and therefore hotter part of the molten glass under the non-heating zone of the element is unheated.

1 Claim, 2 Drawing Sheets

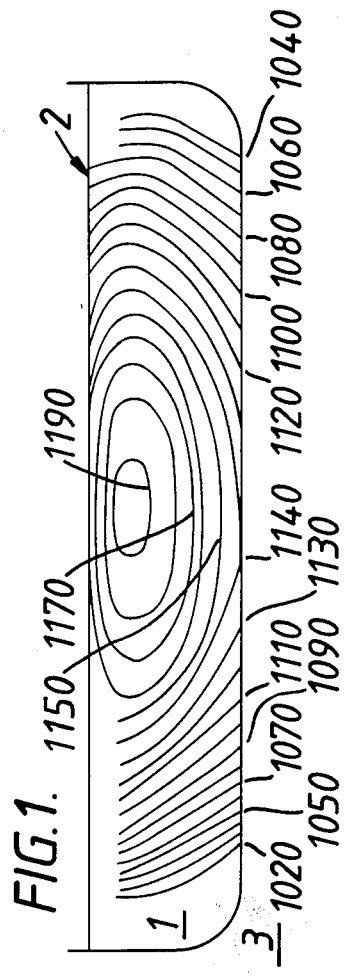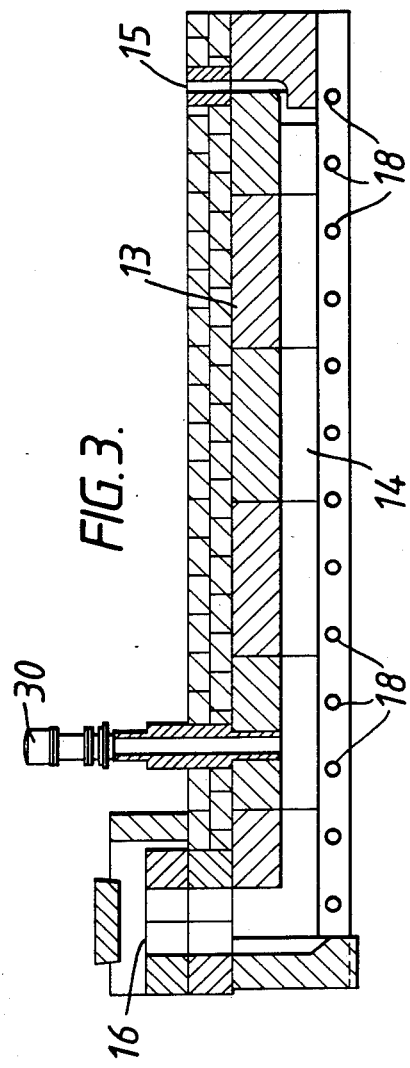

ELECTRICALLY HEATED FOREHEARTH

FIELD OF THE INVENTION

This invention relates to an electrically heated forehearth for use in glass production.

BACKGROUND TO THE INVENTION

In glass production, molten glass is produced in a melting furnace and then passes along a forehearth before being led away for further processing. For example in the production of glass articles the molten glass from the forehearth may pass to a spout where it is formed into gobs which are subsequently formed into the desired articles. Generally in any particular installation there are several forehearths each with a spout fed by a single melting furnace.

Conventional forehearths comprise a refractory trough along which the molten glass flows e.g. to the spout. It is a problem of forehearths that the molten glass at the edge portions tends to cool more rapidly and thus be at a lower temperature than the molten glass in the central part of the forehearth. These differences in temperature of the glass result in different viscosities and accordingly in differences in the speed with which the molten glass moves down the forehearth. The central, hottest glass will be least viscous and thus move down the forehearth faster than the more viscous glass at the edge of the forehearth. This all results in substantial inhomogeneity of the glass across the forehearth. This in turn means that the gobs formed from that glass are not uniform and accordingly leads to variation in the glassware made from those gobs.

It is known to mount gas burners along the edges of a forehearth above the molten glass in the forehearth so that the glass in the edge regions becomes heated to decrease the cooling at the edge portions of the glass and accordingly to make the glass more homogeneous across the forehearth.

In many forehearth installations however the use of gas burners is not appropriate. In some locations gas is not available at all and in other locations, while gas may be available, it is not feasible to use it economically. For example in some countries of the world, hydro-electricity is a relatively cheap power source.

It is known to heat molten glass by means of electrodes submerged in the glass. Current is passed between electrodes, through the glass, to heat the glass, particularly along the edge of the molten glass stream. This improves the homogeneity of the molten glass but results in considerable corrosion of the submerged electrodes.

It is also known to provide radiant heating electrode elements along the length of a forehearth and each of which passes across the forehearth perpendicular to the direction of glass flow and above the level of the molten glass in the forehearth. While this does provide for electric heating of the molten glass in a forehearth while avoiding the problems associated with submerged electrodes, the glass is heated across the whole width of the forehearth and thus use of such an element does little to overcome the problems of inhomogeneity due to temperature differences across the molten glass.

DESCRIPTION OF THE INVENTION

According to the present invention, there is provided a forehearth for molten glass, which forehearth comprises a refractory trough and a refractory roof thereover, there being provided, along the length of the forehearth above the molten glass level in the forehearth, a plurality of radiant heating elements, each element traversing the forehearth substantially at right angles to the direction of glass flow and each element comprising heating zones at each edge portion and a central non-heating zone.

Thus with the forehearth according to the present invention the molten glass is heated electrically at its edge, cooler, portions only without the use of submerged electrodes.

Moreover the construction according to the present invention is particularly adapted to the good control of glass homogeneity within the forehearth.

The forehearth according to the present invention may be either transversely or, preferably, longitudinally cooled. It is well known to provide for cooling within forehearths by blowing cooling air either transversely across the forehearth roof surface substantially at right angles to the direction of glass flow within the forehearth or longitudinally along the forehearth roof surface in the direction of glass flow.

Preferably the forehearth according to the present invention has a longitudinal, substantially central cooling channel in the roof thereof and an element in which the heating zones extend substantially to under the edges of the channel and the non-heating zone extends under the channel. This construction has been found to be particularly effective in ensuring homogeneity of glass across the forehearth.

Suitably there is provided temperature detection means within the forehearth and means for varying the amount of electricity provided to the heating elements according to the temperature detected within the forehearth.

DESCRIPTION OF SPECIFIC EMBODIMENTS

The invention is further described with reference to the accompanying drawings wherein:

FIG. 1 shows the isotherms in a cross-section in a typical forehearth;

FIG. 3 is a partial longitudinal section through the upper part of the forehearth of FIG. 2.

Figure 2:
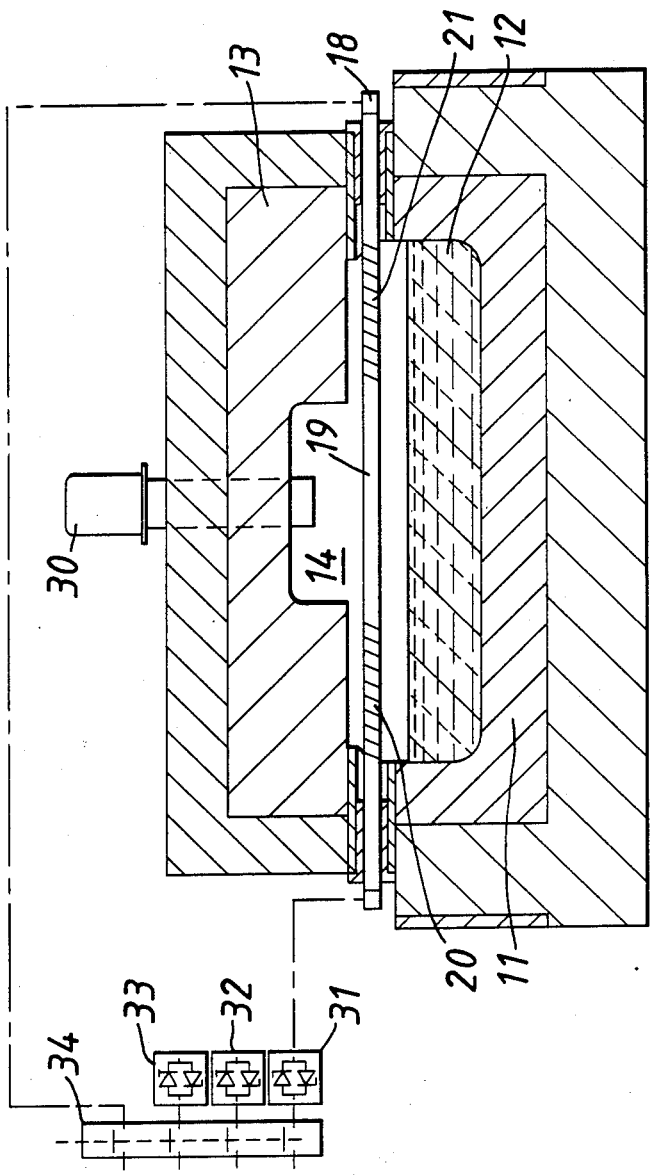
FIG. 2 is a transverse section through a forehearth according to the present invention with the temperature control means shown diagrammatically.

In FIG. 1 the temperatures are shown in degrees Centigrade. There is shown in FIG. 1 for a cross-section through molten glass 1 to level 2 in a typical forehearth 3 a typical isotherm distribution. It can be readily seen from this FIG. how in a typical forehearth the temperature in the centre of the molten glass flow is considerably higher from that at the edges.

Referring to FIGS. 2 and 3, the forehearth according to the present invention comprises a refractory trough 11 along which the molten glass 12 passes from right to left as shown in FIG. 3. Over the trough 11 there is provided an insulating roof 13 which has a longitudinal central cooling channel 14 having an inlet 15 for cooling air and an outlet 16 for exhaustion of the air stream so that air flow is also from right to left as shown in FIG. 3.

Between the trough 11 and roof 13 there are mounted across the forehearth perpendicular to the direction of glass flow, a plurality of spaced apart radiant heating elements 18. The elements 18 are thus positioned above the molten glass 12 in the trough 11.

Each element 18 comprises a cool (non-heating) central zone 19 above the central part of the glass flow and two hot (heating) edge zones 20, 21 above the edge portions of the molten glass 12 in the trough 11. As can be seen from FIG. 2, the heated zones 20 and 21 of each element 18 extend substantially to under the edges of the central cooling channel 14 with the cool zone 19 extending across and under the channel 14.

In use of the forehearth shown in FIGS. 2 and 3, the molten glass 12 is passed down the trough 11 in the usual way. As the molten glass 12 moves down the trough 11 it is radiantly heated from above by means of the radiant heating elements 18 along its length. However this heating only occurs at the cooler edge portions of the molten glass 12 in the trough 11 by means of heating zones 20 and 21 of the elements 18. The cool (non-heating) central zones 19 of the elements 18 leave the hotter central portion of the molten glass unheated. In addition cooling air is passed into the forehearth through inlet 15, along the longitudinal channel 14 to cool the central portion of molten glass therebelow and is then exhausted through outlet 16. Thus improved homogeneity of temperature compared with the conventional electric radiant heating elements is obtained across the molten glass stream in the trough 11.

For further improved temperature control within the forehearth according to the present invention, there may be provided within the forehearth one or more optical pyrometers 30 to detect the glass temperature within the forehearth. As shown in FIG. 3, one pyrometer 30 is provided towards the downstream end of trough 11.

The radiant heating elements 18 are connected via thyristor units 31, 32, 33 to a three phase electrical supply from a transformer (not shown). A zone isolator 34 is provided between the thyristor units 31, 32, 33 and the supply. There may be more than one element 18 per phase of the supply.

When the pyrometer 30 detects any variation from the required glass temperature in the forehearth, the thyristor units 31, 32, 33 may be used to control the amount of power given to the elements 18 and accordingly the heat given out by them. In this way the required molten glass temperature may be returned to.

I claim:

1. In an electrically heated forehearth for molten glass, which forehearth comprises a refractory trough and a refractory roof thereover, there is provided, along the length of the forehearth above the molten glass level in the forehearth, a plurality of radiant heating elements, each element traversing the forehearth substantially at right angles to the direction of glass flow and each element comprising a heating zone at each edge portion and a central, non-heating zone an wherein said roof has a longitudinal substantially central cooling channel and in which the heating zones of each said element extent substantially to under the edges of said channel and the non-heating zone of each said element extends under the channel.

* * * * *